(12) United States Patent
Lafferty et al.

(10) Patent No.: US 11,326,124 B2
(45) Date of Patent: May 10, 2022

(54) RECIRCULATING HIGH PRESSURE LIPID (HPL) EXTRACTOR, INFUSER AND BONDER, AND SYSTEM AND METHOD OF USE THEREOF

(71) Applicant: HALCYON HOLDINGS, LLC, Monroe, NC (US)

(72) Inventors: Robert Lafferty, Waxhaw, NC (US); Natalia Parillo, Waxhaw, NC (US)

(73) Assignee: HALCYON HOLDINGS, LLC, Monroe, NC (US)

( * ) Notice: Subject to any disclaimer, the term of this patent is extended or adjusted under 35 U.S.C. 154(b) by 12 days.

(21) Appl. No.: 16/881,478

(22) Filed: May 22, 2020

(65) Prior Publication Data

US 2021/0079314 A1 Mar. 18, 2021

Related U.S. Application Data

(60) Provisional application No. 62/899,842, filed on Sep. 13, 2019.

(51) Int. Cl.
*B01D 11/02* (2006.01)
*B01J 3/03* (2006.01)
*C11B 1/10* (2006.01)

(52) U.S. Cl.
CPC .............. *C11B 1/10* (2013.01); *B01D 11/028* (2013.01); *B01D 11/0219* (2013.01);
(Continued)

(58) Field of Classification Search
CPC .... C11B 1/10; C11B 1/00; C11B 1/12; B01D 11/0219; B01D 11/028; B01D 11/0288;
(Continued)

(56) References Cited

U.S. PATENT DOCUMENTS 3,018,564 A * 1/1962 Kruse ...................... B01J 8/10
34/173
3,977,973 A * 8/1976 Anderson .............. B01D 37/02
210/167.28
(Continued)

FOREIGN PATENT DOCUMENTS

CN 106108008 A 11/2016

OTHER PUBLICATIONS

International Search Report and Written Opinion dated Oct. 30, 2020 for corresponding International Application No. PCT/US2020/044677.

*Primary Examiner* — Joseph W Drodge
(74) *Attorney, Agent, or Firm* — Jeffrey C. Watson; Grell & Watson Patent Attorneys LLC

(57) ABSTRACT

A recirculating high pressure lipid extractor includes a kettle with a sealed interior configured for pressurizing and heating a fluid mixture. A flow funnel is positioned in a lower portion. A removable material basket is positioned on top of the flow funnel in an upper section. The removable material basket is configured to hold a material inside the removable material basket. A drain and inlet port is at a bottom of the kettle in communication with the sealed interior of the kettle. A recirculation port is approximate a top of the kettle in communication with the sealed interior of the kettle. Wherein, when the fluid mixture is inserted into the kettle, the recirculating high pressure lipid extractor is configured to pressurize and heat the fluid mixture and recirculate the pressurized and heated fluid mixture from the recirculation port into the drain and inlet port.

19 Claims, 9 Drawing Sheets

(52) U.S. Cl.
CPC ...... *B01D 11/0288* (2013.01); *B01D 11/0207* (2013.01); *B01J 3/03* (2013.01)

(58) Field of Classification Search
CPC .... B01D 11/0207; B01D 1/00; B01D 1/0011; B01D 1/0041; B01D 1/0047; B01D 1/0082; B01D 1/0094; B01D 1/30; B01D 3/38; B01D 3/40; B01D 3/42; B01D 5/00; B01D 5/0078; B01D 5/0081; B01D 5/009; B01D 11/0215; B01D 17/00; B01D 17/0005; B01D 17/12; B01J 3/03; C07C 37/004; C07C 37/74; C07C 37/76; C07C 37/80; A61K 36/185; A23D 7/02; A23D 7/04

See application file for complete search history.

(56) References Cited

U.S. PATENT DOCUMENTS

| | | | |
|---|---|---|---|
| 5,024,846 | A | 6/1991 | McLachlan et al. |
| 5,649,476 | A * | 7/1997 | Montagnino ........... A47J 27/04 122/31.1 |
| 6,598,515 | B1 | 7/2003 | Bove |
| 9,394,504 | B1 * | 7/2016 | Shepherd ................. C11B 1/14 |
| 9,937,218 | B2 | 4/2018 | Towle |
| 10,406,453 | B2 | 9/2019 | Ko et al. |
| 10,806,767 | B1 * | 10/2020 | Saha ................... A61K 36/9066 |
| 10,973,864 | B2 | 4/2021 | Venturini Del Greco |
| 2003/0124204 | A1 | 7/2003 | Sweet |
| 2006/0074254 | A1 * | 4/2006 | Zhang ................ B01D 11/0288 549/510 |
| 2016/0228787 | A1 | 8/2016 | Payack |
| 2017/0049830 | A1 * | 2/2017 | Raderman ............ A61K 9/0014 |
| 2017/0196923 | A1 | 7/2017 | Moore |
| 2017/0246557 | A1 * | 8/2017 | Skell ..................... A61K 36/00 |
| 2017/0360861 | A1 | 12/2017 | Humphreys et al. |
| 2018/0094209 | A1 | 4/2018 | Carberry et al. |
| 2018/0206518 | A1 | 7/2018 | Silver |
| 2018/0296616 | A1 | 10/2018 | Rivas |
| 2019/0060227 | A1 | 2/2019 | Silver |
| 2019/0099696 | A1 | 4/2019 | Ko et al. |
| 2019/0153345 | A1 | 5/2019 | Lee et al. |
| 2019/0232194 | A1 * | 8/2019 | Lombardi ........... A61K 36/185 |
| 2021/0052105 | A1 * | 2/2021 | Bojie ..................... A47J 31/52 |
| 2021/0189287 | A1 * | 6/2021 | Koumans ................. C11B 1/10 |

\* cited by examiner

RECIRCULATING HIGH PRESSURE LIPID (HPL) EXTRACTOR, INFUSER AND BONDER, AND SYSTEM AND METHOD OF USE THEREOF

CROSS-REFERENCE TO RELATED APPLICATIONS

This application claims benefit of priority application U.S. Provisional Ser. No. 62/899,842 filed on Sep. 13, 2019, entitled "High Pressure Lipid (HPL) Extractor, Infuser, and Bonder", which is incorporated herein by reference in its entirety.

FIELD OF THE DISCLOSURE

The present disclosure is related to a means and method for the extraction and bonding of *Cannabis* and other botanical extracts. More specifically, the present disclosure relates to a recirculating high pressure lipid ("HPL") extractor, infuser and/or bonder, and a system and method of use thereof, for the extraction and bonding of *Cannabis* and other botanical extracts with no solvents or chemicals.

BACKGROUND

Generally speaking, in biology and biochemistry, a lipid is a macrobiomolecule that is soluble in nonpolar solvents. Non-polar solvents are typically hydrocarbons used to dissolve other naturally occurring hydrocarbon lipid molecules that do not (or do not easily) dissolve in water, including fatty acids, waxes, sterols, fat-soluble vitamins (such as vitamins A, D, E, and K), monoglycerides, diglycerides, triglycerides, and phospholipids. The functions of lipids include storing energy, signaling, and acting as structural components of cell membranes. Lipids have applications in the cosmetic and food industries as well as in nanotechnology. Scientists sometimes define lipids as hydrophobic or amphiphilic small molecules. Although the term "lipid" is sometimes used as a synonym for fats, fats are a subgroup of lipids called triglycerides. Lipids also encompass molecules such as fatty acids and their derivatives (including tri-, di-, monoglycerides, and phospholipids), as well as other sterol-containing metabolites such as cholesterol. Although humans and other mammals use various biosynthetic pathways both to break down and to synthesize lipids, some essential lipids can't be made this way and must be obtained from the diet.

Lipids are insoluble in water and are commonly extracted from tissue, cells, or fluids using organic solvents. The efficiency of lipid extraction depends on the partitioning of different lipids into the organic phase and lipid composition of the sample. The most commonly used solvent systems for lipid extraction are known or standard protocols based on known or published methods. These and other solvent systems are routinely applied to a wide range of biological samples for lipid extraction.

The instant disclosure recognized the problem with these commonly used solvent system for lipid extractions which require solvents or chemicals for the extraction, infusion and/or bonding process of lipids. The use of these solvents or chemicals leads to the solvents or chemicals being present in the lipids being extracted, infused and/or bonded and thus results in an unnatural product with such commonly used solvent systems. In addition, the instant disclosure recognizes the need or desire for faster and more efficient lipid extraction processes.

Therefore, a need exists for a means, system and/or method for lipid extraction that is natural or does not require solvents or chemicals and is faster and more efficient than the known or commonly used solvent systems for lipid extraction.

The instant disclosure may be designed to address at least certain aspects of the problems or needs discussed above by providing a recirculating high pressure lipid extractor, infuser, and bonder, and method of use thereof.

SUMMARY

The present disclosure solves the aforementioned limitations of the currently available devices and methods of extraction, infusing and/or bonding, by providing a recirculating high pressure lipid extractor, infuser and bonder, and a method of use thereof. The disclosed device, system or method may be configured for extracting, infusing, and/or bonding *Cannabis* and other botanical (i.e. Lavender, Rosemary, Citrus, Mint, etc.) extracts to Fat (i.e. MCT Oils, Hemp Oil, Butter, Butter Fat, all seed oils, olive oil, etc.). In general, the recirculating high pressure lipid extractor disclosed herein includes a kettle. The kettle has a sealed interior configured for pressurizing and heating a fluid mixture in the sealed interior. A flow funnel is positioned in a lower portion of the sealed interior of the kettle. A removable material basket is positioned on top of the flow funnel in the sealed interior of the kettle in an upper section. The removable material basket is configured to hold a material inside a flow-through interior of the removable material basket in the upper section of the sealed interior of the kettle. A drain and inlet port is at a bottom of the kettle in communication with the sealed interior of the kettle. A recirculation port is approximate a top of the kettle in communication with the sealed interior of the kettle. Wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material positioned therein, and back out of the recirculation port.

In select embodiments of the disclosed recirculating high pressure lipid extractor disclosed herein, the fluid mixture can include water and fat, and the material in the removable material basket is a fat soluble plant matter that includes lipids. Wherein, when the pressurized and heated fluid mixture is recirculated through the kettle and the fat soluble plant matter is in the removable material basket, lipids from the fat soluble plant matter in the removable material basket can be extracted, infused, bonded, or combinations thereof, to the fat in the fluid mixture.

One feature of the disclosed recirculating high pressure lipid extractor disclosed herein may be that the recirculating high pressure lipid extractor may be configured for natural extraction, infusion and bonding of lipids from the fat soluble plant matter with no solvents or chemicals.

In select embodiments of the disclosed recirculating high pressure lipid extractor disclosed herein, the fat of the fluid mixture may include medium-chain triglycerides oils, hemp oil, butter, butter fat, all seed oils, olive oil, or combinations thereof, and the fat soluble plant matter can include *Cannabis* or other botanical extracts including lavender extracts, rosemary extracts, citrus extracts, or mint extracts, or combinations thereof. Wherein, the natural extraction, infusion and bonding with no solvents or chemicals is configured for natural extraction, infusion and bonding of the *Cannabis*, the other botanical extracts, or combinations thereof.

Another feature of the disclosed recirculating high pressure lipid extractor disclosed herein may be that the recirculating high pressure lipid extractor can be configured to heat and cool the fat in the fluid mixture as it recirculates reducing degradation of terpenes, flavonoids, and other cannabinoids.

Another feature of the disclosed recirculating high pressure lipid extractor disclosed herein may be that the recirculating high pressure lipid extractor can be configured to decarboxylate the *Cannabis, Cannabis* extracts, *Cannabis* extract bonded fats, or combinations thereof.

In select embodiments of the disclosed recirculating high pressure lipid extractor disclosed herein, the kettle may be configured to operate at temperatures of 210° F. to 220° F. or at pressures of 15 ps to 50 psi. In select embodiments, the kettle may be configured to operate at temperatures of 210° F. to 220° F. and at pressures of 15 psi to 35 psi or at pressure of 40 psi to 45 psi.

In select embodiments of the disclosed recirculating high pressure lipid extractor disclosed herein, a recirculation pump may be included. The recirculation pump may be connected between the recirculation port approximate the top of the kettle and the drain and inlet port at the bottom of the kettle. Wherein the recirculation pump may be configured to increase pressure and recirculation of the fluid mixture in the kettle. In select embodiments, as an example, the recirculation pump may be case rated at 50 lb.

Another feature of the disclosed recirculating high pressure lipid extractor disclosed herein may be that the kettle is configured to be mobile.

Another feature of the disclosed recirculating high pressure lipid extractor disclosed herein may be that the kettle is made from a stainless steel material.

Another feature of the disclosed recirculating high pressure lipid extractor disclosed herein may be that the kettle is configured to be scaled from 1 gallon to 5000 gallons.

In select embodiments of the disclosed recirculating high pressure lipid extractor disclosed herein the kettle may include a steam jacket. The steam jacket may be configured for heating the fluid mixture in the sealed interior of the kettle. The steam jacket of the kettle may include at least one feed port configured for feeding steam into the steam jacket of the kettle, and at least one return port for returning steam out of the steam jacket of the kettle. In select embodiments, the steam jacket of the kettle may include an upper steam jacket and a lower steam jacket. The upper steam jacket may be around the removable material basket in the upper section of the sealed interior of the kettle. The upper steam jacket may include at least one upper feed port configured for feeding steam into the upper steam jacket of the kettle, and at least one upper return port for returning steam out of the upper steam jacket of the kettle. The lower steam jacket may be around the flow funnel in the lower portion of the sealed interior of the kettle. The lower steam jacket may include at least one lower feed port configured for feeding steam into the lower steam jacket of the kettle, and at least one lower return port for returning steam out of the lower steam jacket of the kettle. In select embodiments, a temperature sensor port may be included with the steam jacket of the kettle. The temperature sensor port may be configured for sensing the temperature inside the kettle in the upper section and lower portion of the sealed interior. Whereby, the temperature sensor port may be configured to communicate with the steam jacket of the kettle for regulating the temperature of the fluid mixture inside the kettle.

In select embodiments of the disclosed recirculating high pressure lipid extractor disclosed herein, cooling coils may be included. The cooling coils may be configured for cooling the fluid mixture after it is pressurized, heated and recirculated through the sealed interior of the kettle. In select embodiments, the cooling coils may include a cooling coil water in connector, and a cooling coil water out connector.

In select embodiments of the disclosed recirculating high pressure lipid extractor disclosed herein, the removable material basket may include a plurality of holes around a bottom portion of the removable material basket. In other select embodiments, the removable material basket may include a removable lid with micron sized holes on a top of the removable material basket. In select embodiments, the removable lid may include lifting hooks configured for lifting the removable material basket out of the sealed interior of the kettle. In select embodiments of the removable material basket, a split trap door bottom may be included configured to open for removing material from the removable material basket.

In select embodiments of the disclosed recirculating high pressure lipid extractor disclosed herein, the sealed interior of the kettle may include a shelf. The shelf may be configured for holding the removable material basket on top of the flow funnel.

In select embodiments of the disclosed recirculating high pressure lipid extractor disclosed herein, the recirculation port may include a removable return arm. The removable return arm may be configured to be removed for inserting and removing the removable material basket.

In select embodiments of the disclosed recirculating high pressure lipid extractor disclosed herein, a removable stainless steel lid may be included. The removable stainless steel lid may be configured to seal the sealed interior of the kettle with a sealing flange including a double O-ring seal and wing type hold down bolts with hold down rods configured to seal the lid to the sealed interior of the kettle. In select embodiments, lifting points on the removable stainless steel lid may be included that are configured for lifting the kettle thereby making the recirculating high pressure lipid extractor mobile. In other select embodiments, a pressure release valve may be included in the removable stainless steel lid that are configured for releasing pressure over a certain threshold of the sealed interior of the kettle. In other select embodiments, a vent valve may be included in the removable stainless steel lid configured for venting the sealed interior of the kettle. In other select embodiments, a clean in place port may be included in the removable stainless steel lid configured for cleaning the sealed interior of the kettle. In other select embodiments, a liquid input port may be included in the removable stainless steel lid configured for inserting the fluid mixture into the sealed interior of the kettle. In other select embodiments, a pressure sensor port may be included in the removable stainless steel lid configured for sensing the pressure in the sealed interior of the kettle. In other select embodiments, a sample finished product port may be included in the removable stainless steel lid configured for sampling the lipids extracted, infused, bonded, or combinations thereof, to the fat in the fluid mixture.

In another aspect, the instant disclosure embraces a system for lipid extraction, infusion and bonding. The disclosed system generally includes utilizing the recirculating high pressure lipid extractor in any of the various embodiments or combinations of embodiments shown and/or described herein. As such, the system for lipid extraction, infusion and bonding may generally include the recirculating high pressure lipid extractor configured for extracting, infusing and bonding lipids from a material with no solvents or chemicals via a pressurized and heated fluid mixture, a recirculation pump, a heater, a holding tank, a cooler, and a control panel. The pump may be configured for recirculating the pressurized and heated fluid mixture through the recirculating high pressure lipid extractor. The heater may be configured for heating the recirculating high pressure lipid extractor. The holding tank may be configured to hold and chill the fluid mixture with extracted, infused and bonded lipids. The cooler may be configured to chill the fluid mixture with extracted, infused and bonded lipids in the holding tanks. The control panel may be configured to provide control for proper operation, temperature, pressure ranges, process timing and/or material flow of the system.

In select embodiments of the system for lipid extraction, infusion and bonding disclosed herein, three of the recirculating high pressure lipid extractors may be included along with three recirculation pumps, one recirculation pump for each of the three recirculating high pressure lipid extractors. As such, the system for lipid extraction, infusion and bonding disclosed herein may include providing the recirculating high pressure lipid extractor in any of the various embodiments or combination of embodiments shown and/or described herein. In addition, three holding tanks may be included. In select embodiments of the system for lipid extraction, infusion and bonding disclosed herein, the heater may be a steam boiler configured to provide steam in a steam jacket of each of the three recirculating high pressure lipid extractors for heating each of the three recirculating high pressure lipid extractor. In select embodiments of the system for lipid extraction, infusion and bonding disclosed herein, the cooler may be a chiller and screw press configured to circulate ethanol and chill it to −40° C. in 45 minutes, where the circulation will continue for 15 extra minutes to drop the fats and lipids out of suspension prior to pumping through filters. In other select embodiments, a glycol chiller may be installed outdoors configured to chill the holding tanks.

In another aspect, the instant disclosure embraces a method for lipid extraction, infusion and bonding. In general, the instant method for lipid extraction, infusion and bonding includes utilizing the recirculating high pressure lipid extractor in any of the various embodiments or combination of embodiments shown and/or described herein. As such, the method for lipid extraction, infusion and bonding disclosed herein may include providing the recirculating high pressure lipid extractor in any of the various embodiments or combination of embodiments shown and/or described herein. The provided recirculating high pressure lipid extractor may be configured for extracting, infusing and bonding lipids from a material with no solvents or chemicals via a pressurized and heated fluid mixture. With the provided recirculating high pressure lipid extractor, the method may further include the steps of: filling the kettle with the fluid mixture; removing the removable material basket from the kettle; inserting the material into the removable material basket; putting the removable material basket with the inserted material back into the sealed interior of the kettle; sealing the sealed interior of the kettle; heating the kettle thereby generating an internal pressure; and recirculating the heated and pressurized fluid mixture upward through the flow funnel where it passes into the removable material basket and through the material inside the removable material basket, out of the removable material basket, into the recirculation port and back into the drain and inlet port. Wherein, when the fluid mixture includes water and fat and the material in the removable material basket is a fat soluble plant matter that includes lipids, when the pressurized and heated fluid mixture is recirculated through the kettle and the fat soluble plant matter is in the removable material basket, lipids from the fat soluble plant matter in the removable material basket are extracted, infused, bonded, or combinations thereof, to the fat in the fluid mixture. Whereby, the recirculating high pressure lipid extractor is configured for natural extraction, infusion and bonding of lipids from the fat soluble plant matter with no solvents or chemicals.

In select embodiments of the disclosed method for lipid extraction, infusion and bonding, the step of heating the kettle thereby generating an internal pressure may include the steps of heating the kettle to approximately 210° F. to 220° F., and the step of thereby generating an internal pressure of approximately 15-35 psi or between 40-45 psi.

In select embodiments of the disclosed method for lipid extraction, infusion and bonding, the step of recirculating the heated and pressurized fluid mixture may include utilizing a recirculating pump configured to increase pressure and recirculation of the fluid mixture in the kettle.

In select embodiments of the disclosed method for lipid extraction, infusion and bonding, the method may further include continuing the cycle for a predetermined amount of time ranging from 10 minutes to 120 minutes. When the cycle is complete: the method may further include pumping the fluid mixture through a plate heat exchanger that is chilled by both city water and glycol; pumping the fluid mixture to a separation tank; and drained the water, thereby leaving the bonded fat to be transferred to storage vessels; and controlling the lipid extraction, infusion and bonding via a central control panel configured to provide proper operation, temperature, pressure ranges, process.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which.

Figure 1:
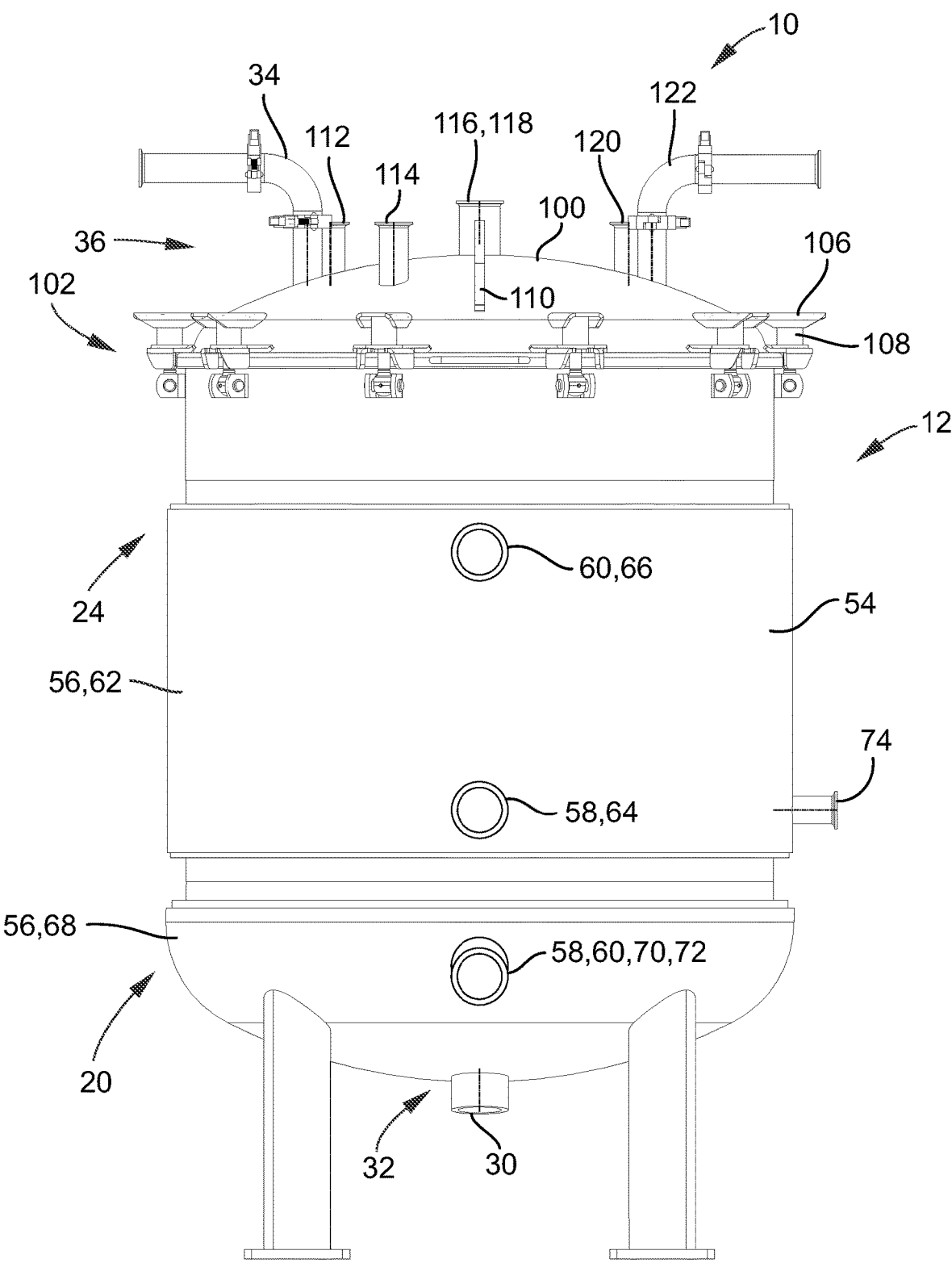
FIG. 1 is a front view of a high pressure lipid extractor, infuser and/or bonder according to select embodiments of the instant disclosure.

It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

DETAILED DESCRIPTION

Referring now to FIGS. 1-9, in describing the exemplary embodiments of the present disclosure, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices and methods of extraction, infusing and/or bonding, by providing recirculating high pressure lipid ("HPL") extractor 10 (see FIGS. 1-4 and 6-8), system 200 (see FIG. 5) for lipid extraction, infusion and/or bonding utilizing HPL extractor 10, and method 300 (see FIG. 9) for lipid extraction, infusion and/or bonding. The disclosed HPL extractor 10, system 200 and/or method 300 may be configured for, but is not limited to, extracting, infusing, and/or bonding *Cannabis* and other botanical (i.e. Lavender, Rosemary, Citrus, Mint, etc.) extracts to Fat (i.e. MCT Oils, Hemp Oil, Butter, Butter Fat, all seed oils, olive oil, etc.).

Referring now to FIGS. 1-4, the present disclosure overcomes the above-mentioned disadvantages and meets the recognized need for such an apparatus, system or method by providing of the disclosed recirculating high pressure lipid ("HPL") extractor, infuser and/or bonder 10. The disclosed recirculating high pressure lipid extractor, infuser and/or bonder 10 may be referred to herein as just recirculating high pressure lipid extractor 10 or just HPL extractor 10. The present disclosure of HPL extractor 10 may solve the aforementioned limitations of the currently available devices, systems or methods. Recirculating high pressure lipid extractor disclosed herein may generally include kettle 12. Kettle 12 may be for providing a vessel for processing material 26 at an elevated temperature and pressure for lipid extraction, infusion and/or bonding. As such, kettle 12 may have sealed interior 14 configured for pressurizing and heating fluid mixture 16 in sealed interior 14. Flow funnel 18 may be positioned in lower portion 20 of sealed interior 14 of kettle 12. Flow funnel 18 may be for directing the recirculating material 26 through removable material basket 22 positioned on top of flow funnel 18 in sealed interior 14 of kettle 12 in upper section 24. Flow funnel 18 may be a stainless steel funnel. Thus, removable material basket 22 may be configured to hold material 26 inside flow-through interior 28 of removable material basket 22 in upper section 24 of sealed interior 14 of kettle 12. Drain and inlet port 30 may be at bottom 32 of kettle 12. As an example, drain and inlet port 30 may be a 2 inch inlet port ad main drain valve. Drain and inlet port 30 may serve dual purposes. During operation, drain and inlet port 30 may be utilized to input the recirculating fluid mixture 16 into bottom 32 of sealed interior 14 of kettle 12. After operation, drain and inlet port 30 may be utilized for draining sealed interior 14 of kettle 12. Drain and inlet port 30 may thus be in communication with sealed interior 14 of kettle 12. Recirculation port 34 may be approximate top 36 of kettle 12 and may be in communication with sealed interior 14 of kettle 12. Wherein, when fluid mixture 16 is inserted into sealed interior 14 of kettle 12, recirculating HPL extractor 10 may be configured to pressurize and heat fluid mixture 16 and recirculate the pressurized and heated fluid mixture from recirculation port 34 approximate top 36 of kettle 12 into drain and inlet port 30 at bottom 32 of kettle 12, where pressurized and heated fluid mixture 16 flows through flow funnel 18, into removable material basket 22 and through material 26 positioned therein, and back out of recirculation port 34.

Kettle 12 of recirculating HPL extractor 10 disclosed herein may be designed and configured to operate at various desired temperatures and resulting pressures. In select possibly preferred embodiments, kettle 12 may be configured to operate at temperatures of 210° F. to 220° F. or at resulting pressures of 15 ps to 50 psi. In select embodiments, kettle 12 may be configured to operate at temperatures of 210° F. to 220° F. and at pressures of 15 psi to 35 psi or at pressures of 40 psi to 45 psi. In select embodiments, kettle 12 may be made from stainless steel material 54, including, but not limited to a 304 stainless steel material pressure rated to 60 psi. As an example, kettle 12 may have an ⅛ inch stainless steel cylinder wall. Kettle 12 may be designed and configured to be scaled to any desired size and dimensions, including, but not limited to, from 1 gallon to 5000 gallons.

Recirculating pump 52 may be included with select embodiments of recirculating HPL extractor 10. See FIGS. 4 and 6-9. Recirculation pump 52 may be for aiding in recirculating fluid mixture 16 through sealed interior 14 of kettle 12 and for increasing pressure inside of sealed interior 14 of kettle 12. Recirculation pump 52 may be connected between recirculation port 34 approximate top 36 of kettle 12 and drain and inlet port 30 at bottom 32 of kettle 12. Wherein, recirculation pump 52 may be configured to increase pressure and recirculation of fluid mixture 16 in kettle 12. In select embodiments, as an example and clearly not limited thereto, recirculation pump 52 may be case rated at 50 lb, may include 316 stainless steel, may have a max temperature of 260° F., may be flow rated at 17 GPM, and/or may have a stainless steel housing material.

Another feature of the disclosed recirculating HPL extractor 10 disclosed herein may be that kettle 12 can be configured to be mobile. This feature may allow HPL extractor 10 to be transferred to various locations inside or outside of a processing facility or plant. In select embodiments, HPL extractor 10 may include lifting points 110 on top 36 of kettle 12 for aiding in moving or transporting HPL extractor 10. Lifting points 110 may be included on removable lid 100 of kettle 12. Kettle 12 may be sized and scaled as desired. As an example embodiment, and clearly not limited thereto, kettle 12 may have a fill volume of approximately 100 gallons with a 20 gallon headspace.

Kettle 12 of recirculating HPL extractor 10 may be heated by various devices and methods configured for heating fluid mixture 16 inside of sealed interior 14 of kettle 12. In select embodiments, as shown in the Figures, steam jacket 56 may be included around kettle 12 for heating fluid mixture 16 inside of sealed interior 14 of kettle 12. Steam jacket 56 may be a channel or series of channels around kettle 12 for inclosing steam around kettle 12. Steam jacket 56 may include at least one feed port 58 configured for feeding steam into steam jacket 56 of kettle 12, and at least one return port 60 for returning steam out of steam jacket 56 of kettle 12. In select embodiments, steam jacket 56 of kettle 12 may include upper steam jacket 62 and/or lower steam jacket 68. Upper steam jacket 62 may be around removable material basket 22 in upper section 24 of sealed interior 14 of kettle 12. Upper steam jacket 62 may include at least one upper feed port 64 configured for feeding steam into upper steam jacket 62 of kettle 12, and at least one upper return port 66 for returning steam out of upper steam jacket 62 of kettle 12. Lower steam jacket 68 may be around flow funnel 18 in lower portion 20 of sealed interior 14 of kettle 12. Lower steam jacket 68 may include at least one lower feed port 70 configured for feeding steam into lower steam jacket 68 of kettle 12, and at least one lower return port 72 for returning steam out of lower steam jacket 68 of kettle 12. In select embodiments, temperature sensor port 74 may be included with steam jacket 56 of kettle 12. Temperature sensor port 74 may be configured for sensing the temperature inside kettle 12 in upper section 24 and/or lower portion 20 of sealed interior 14 of kettle 12. Temperature sensor port 74 may include any type of form of temperature sensor positioned therein for sensing the temperature inside kettle 12 in upper section 24 and/or lower portion 20 of sealed interior 14 of kettle 12. Whereby, temperature sensor port 74 may be configured to communicate with steam jacket 56 of kettle 12 for regulating the temperature of fluid mixture 16 inside kettle 12.

Figure 5:
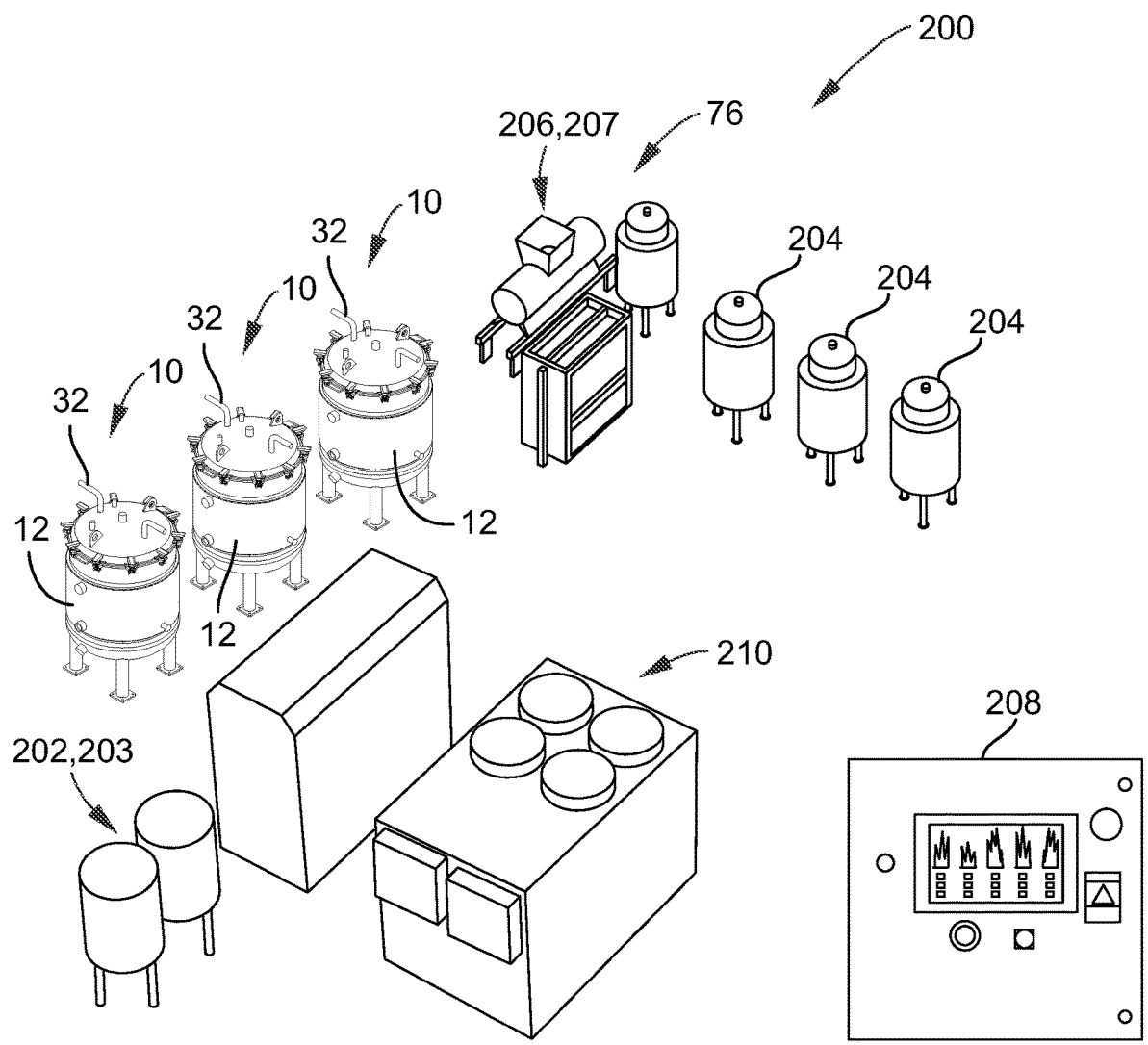
FIG. 5 is an environmental perspective view of a system for lipid extraction, infusion and bonding according to select embodiments of the instant disclosure.

Cooling coils 76 may also be included with or around recirculating HPL extractor 10. Cooling coils 76 may be configured for cooling or chilling fluid mixture 16 after it has been processed in recirculating HPL extractor 10. Thus, cooling coils 76 may be configured for cooling fluid mixture 16 after it is pressurized, heated and recirculated through sealed interior 14 of kettle 12. In select embodiments, the cooling coils may include a cooling coil water in connector, and a cooling coil water out connector. As shown in FIG. 5, cooling coils 76 may be cooler 206, chiller and screw press 207, glycol chiller 210, or combinations thereof.

Figure 2:
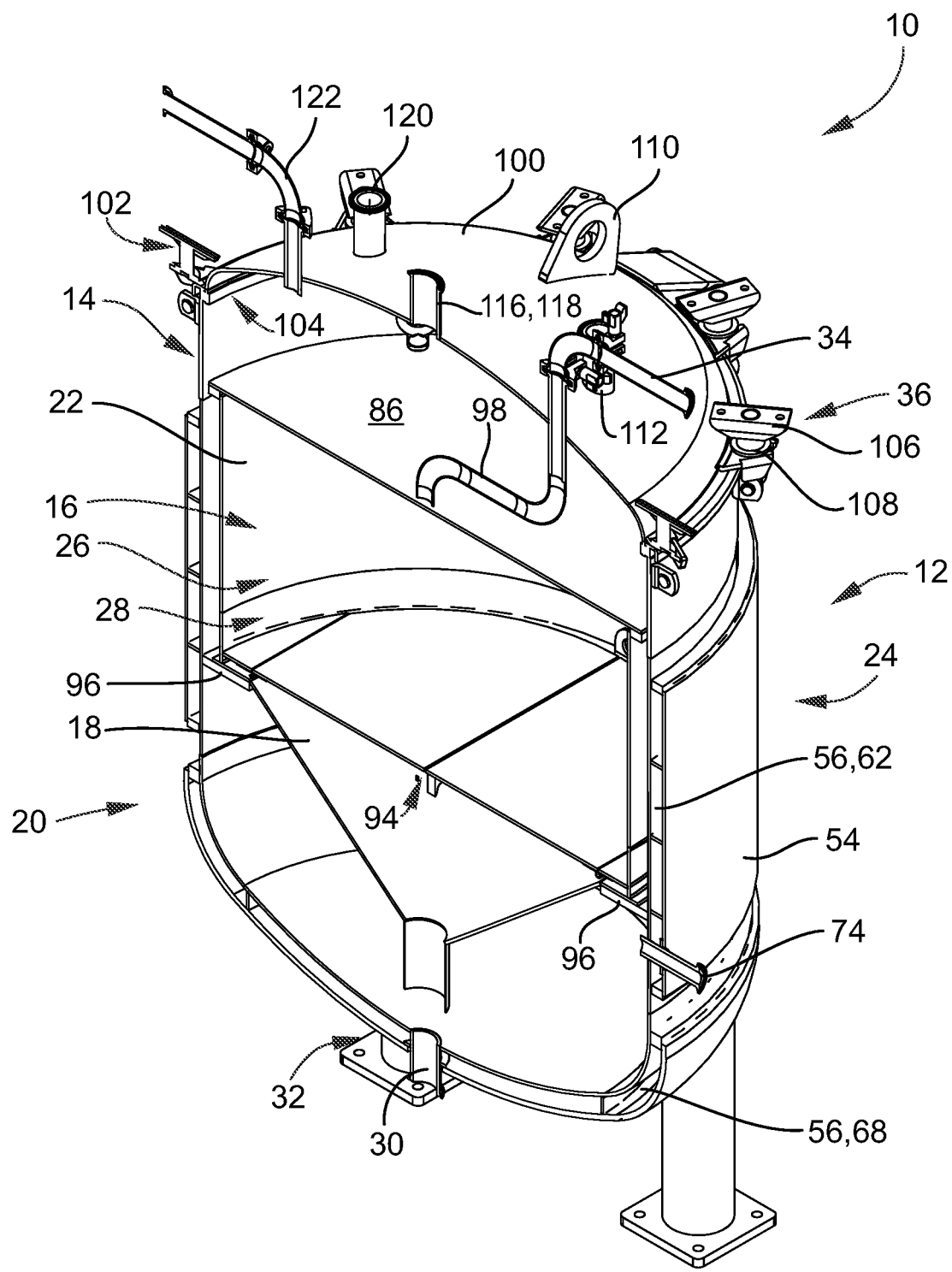
FIG. 2 is a cross-sectional perspective view of the high pressure lipid extractor, infuser and/or bonder of FIG. 1.
Figure 3:
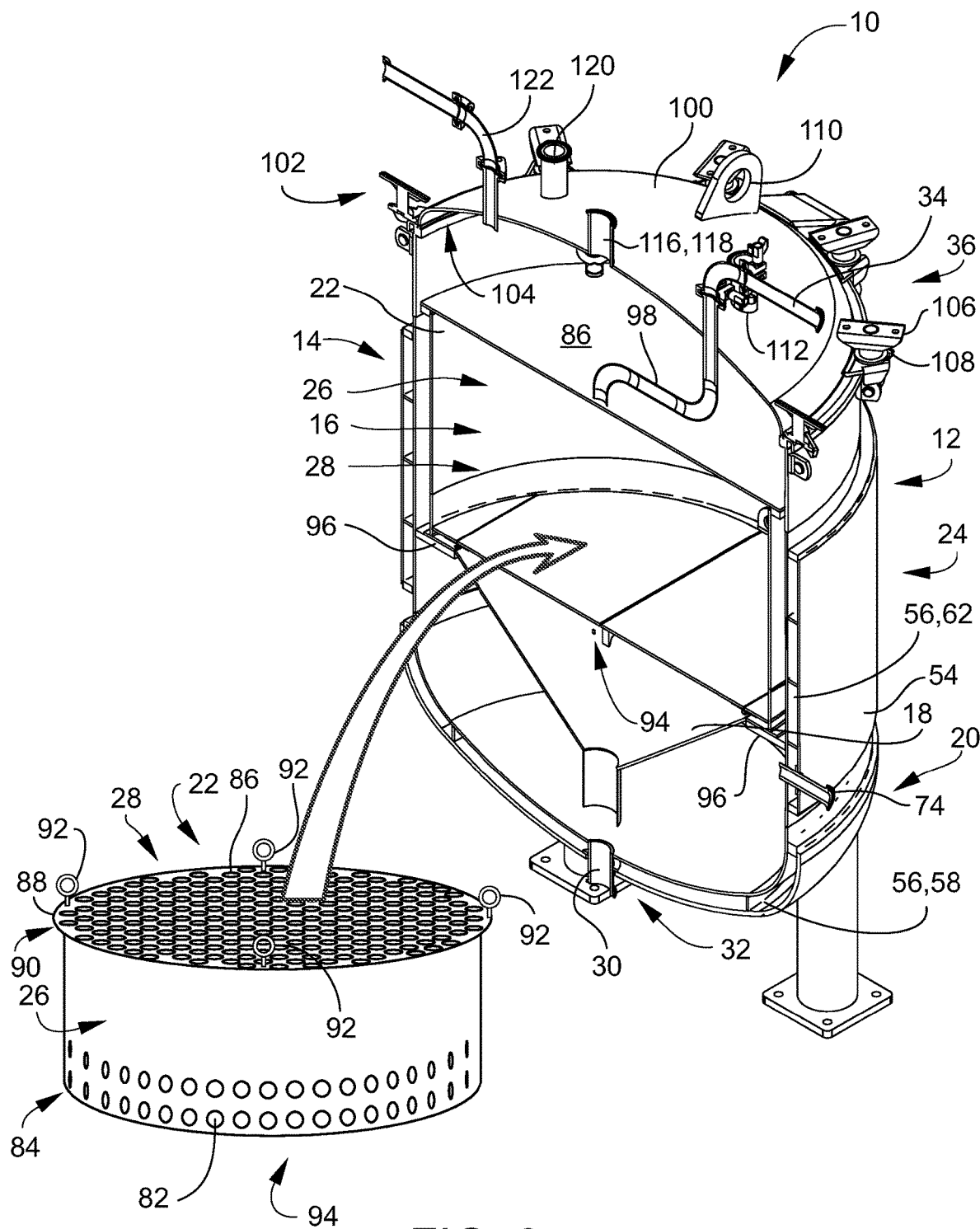
FIG. 3 is another cross-sectional perspective view of the high pressure lipid extractor, infuser and/or bonder of FIG. 1 showing the removable material basket removed from the sealed interior of the kettle.

Referring now specifically to FIG. 3, the details of removable material basket 22 are shown. In select embodiments of the disclosed recirculating HPL extractor 10, as shown in the Figures, removable material basket may include plurality of holes 82 around bottom portion 84 of removable material basket 22. Holes 82 may be for allowing fluid mixture 16 to flow through material 26 positioned inside of removable material basket 22. Holes 82 may also provide mini flow protection for recirculation pump 52. Holes 82 may be configured and sized based on material 26 being processed. Removable material basket 22 may include removable lid 86. In select embodiments, removable lid 86 may include micron sized holes 88 on top 90 of removable material basket 22. These micron sized holes 88 may be designed and configured to maintain material 26 inside of removable material basket 22 while allowing fluid mixture 16 with lipids from material 26 extracted, infused, and/or bonded to fats in fluid mixture 16 to flow freely out of removable material basket 22. In select possibly preferred embodiments, micron sized holes 88 may be, but are clearly not limited thereto, between 20-240 microns, and may preferably be around or equal to 50 microns. In select embodiments, removable lid 86 of removable material basket 22 may include lifting hooks 92 configured for lifting removable material basket 22 out of sealed interior 14 of kettle 12. In select embodiments of removable material basket 22, split trap door bottom 94 may be included. See FIGS. 2 and 3. Split trap door bottom 94 may be configured to open for easily removing material from the removable material basket 22 after processing. The purpose of removable material basket 22 may be to speed up and create ease when loading and unloading material into recirculating HPL extractor 10. Removable material basket 22 may also allow for easier cleaning of the unit. As an example, and clearly not limited thereto, removable material basket 22 can hold from 0-1000 pounds of material depending on size needed for kettle 12. As such, each removable material basket 22 can be built to suit any size of recirculating HPL extractor 10. As an example, and clearly not limited thereto, removable material basket may have a volume of 4.25 cubic feet and/or may have an estimated volume requirement for 125 pounds chopped hemp.

Referring now to FIGS. 2 and 3, in select embodiments of the disclosed recirculating HPL extractor 10 disclosed herein, sealed interior 14 of kettle 12 may include shelf 96. Shelf 96 may be configured for holding removable material basket 22 on top of flow funnel 18. As shown in these Figures, shelf 96 may be a protrusion around the entire sealed interior 14 of kettle 12 designed and configured to position removable material basket 22 on top of flow funnel 18.

Figure 4:
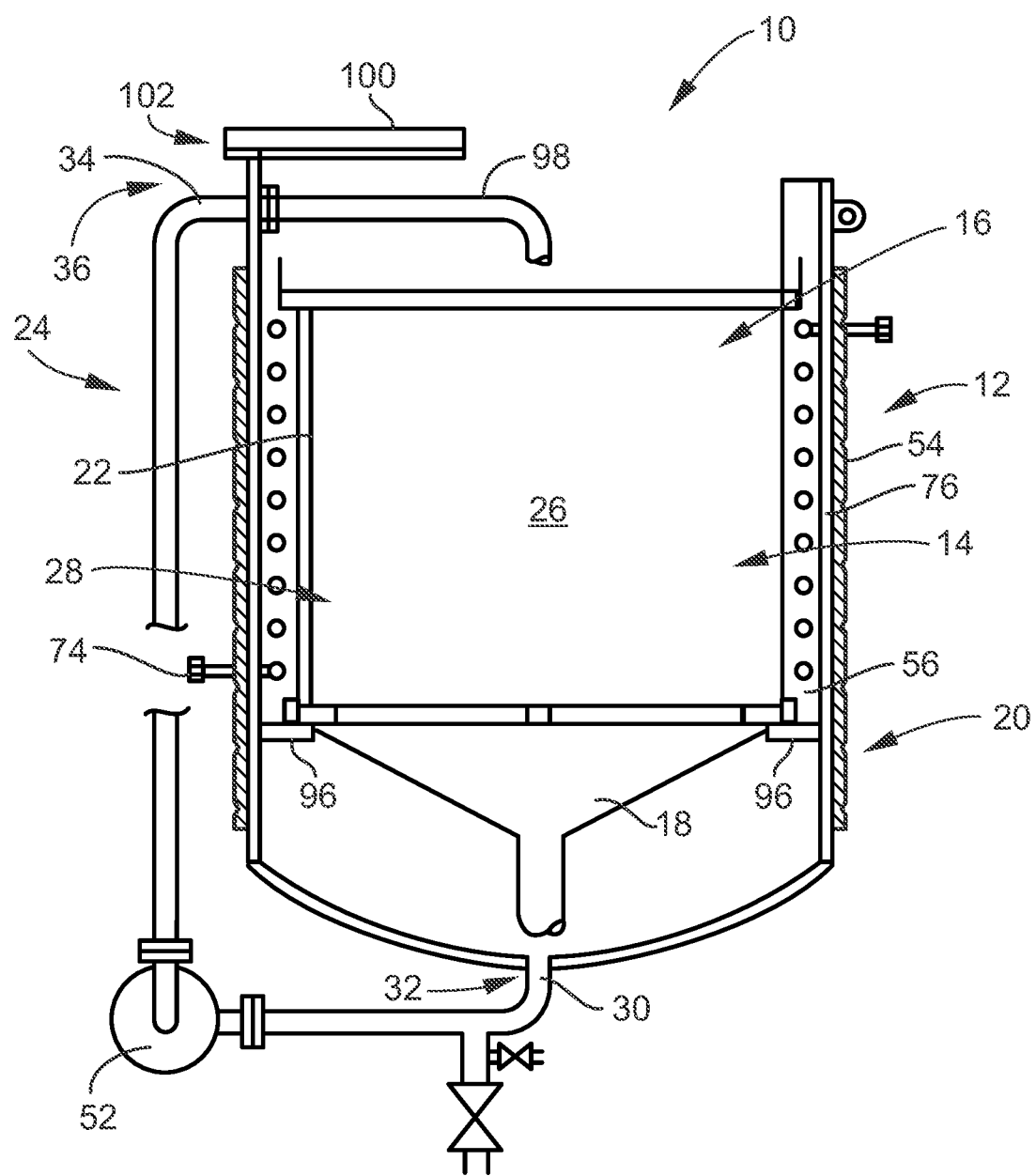
FIG. 4 is a schematic representation of the high pressure lipid extractor, infuser and/or bonder of FIG. 1 showing the recirculating pump in line between the recirculation port and the drain and inlet port.

Referring to FIGS. 2-4, in select embodiments of the disclosed recirculating HPL extractor 10, disclosed herein, recirculation port 34 may include removable return arm 98. Removable return arm 98 may be configured to be removed for inserting and removing removable material basket 22. As an example, and clearly not limited thereto, recirculation port 34 and removable return arm may be a 2 inch recirculation pipe.

As shown in the FIGS. 1-4 and 6-8, removable lid 100 may be included on kettle 12 of recirculating HPL extractor 10. Removable lid 100 may be made of a stainless steel material similar to stainless steel material 54 of kettle 12. Removable stainless steel lid 100 may be configured to close and seal sealed interior 14 of kettle 12 while being openable or removable for allowing access to sealed interior 14 of kettle 12. Removable lid 100 may be sealed to sealed interior 14 of kettle 12 by any means. In select embodiments, as shown in the Figures, removable lid 100 may be sealed with sealing flange 102. Sealing flange 102 may including double O-ring seal 104 and wing type hold down bolts 106 with hold down rods 108 configured to seal lid 100 to sealed interior 14 of kettle 12. In select embodiments, lifting points 110 on removable stainless steel lid 100 may be included that are configured for lifting kettle 12 thereby making recirculating HPL extractor mobile. In other select embodiments, pressure release valve 112 may be included, but is not limited to, in removable stainless steel lid 100. Pressure release valve 112 may be configured for releasing pressure over a certain threshold of sealed interior 14 of kettle 12 for safety purposes. In select embodiments, as an example and clearly not limited thereto, pressure release valve could be configured to release pressure at 50 psi and greater. In other select embodiments, vent valve 114 may be included, but not limited to, in removable stainless steel lid 100. Vent valve 114 may be configured for venting sealed interior 14 of kettle 12. Vent valve 114 may be a ½ inch vent. In other select embodiments, clean in place port 116 may be included, but not limited to, in removable stainless steel lid 100. Clean in place port 116 may be configured for cleaning sealed interior 14 of kettle 12. In other select embodiments, liquid input port 118 may be included, but not limited to, in removable stainless steel lid 100. Liquid input port 118 may be configured for inserting fluid mixture 16 into sealed interior 14 of kettle 12. In other select embodiments, pressure sensor port 120 may be included, but not limited to, in removable stainless steel lid 100. Pressure sensor port 120 may be configured for sensing pressure in sealed interior 14 of kettle 12. In other select embodiments, sample finished product port 122 may be included in, but not limited to, removable stainless steel lid 100. Sample finished product port 122 may be configured for sampling the lipids extracted, infused, bonded, or combinations thereof, to the fat in fluid mixture 16. As an example, and clearly not limited thereto, sample finished product port 122 may be a ¼ inch sample point.

Figure 6:
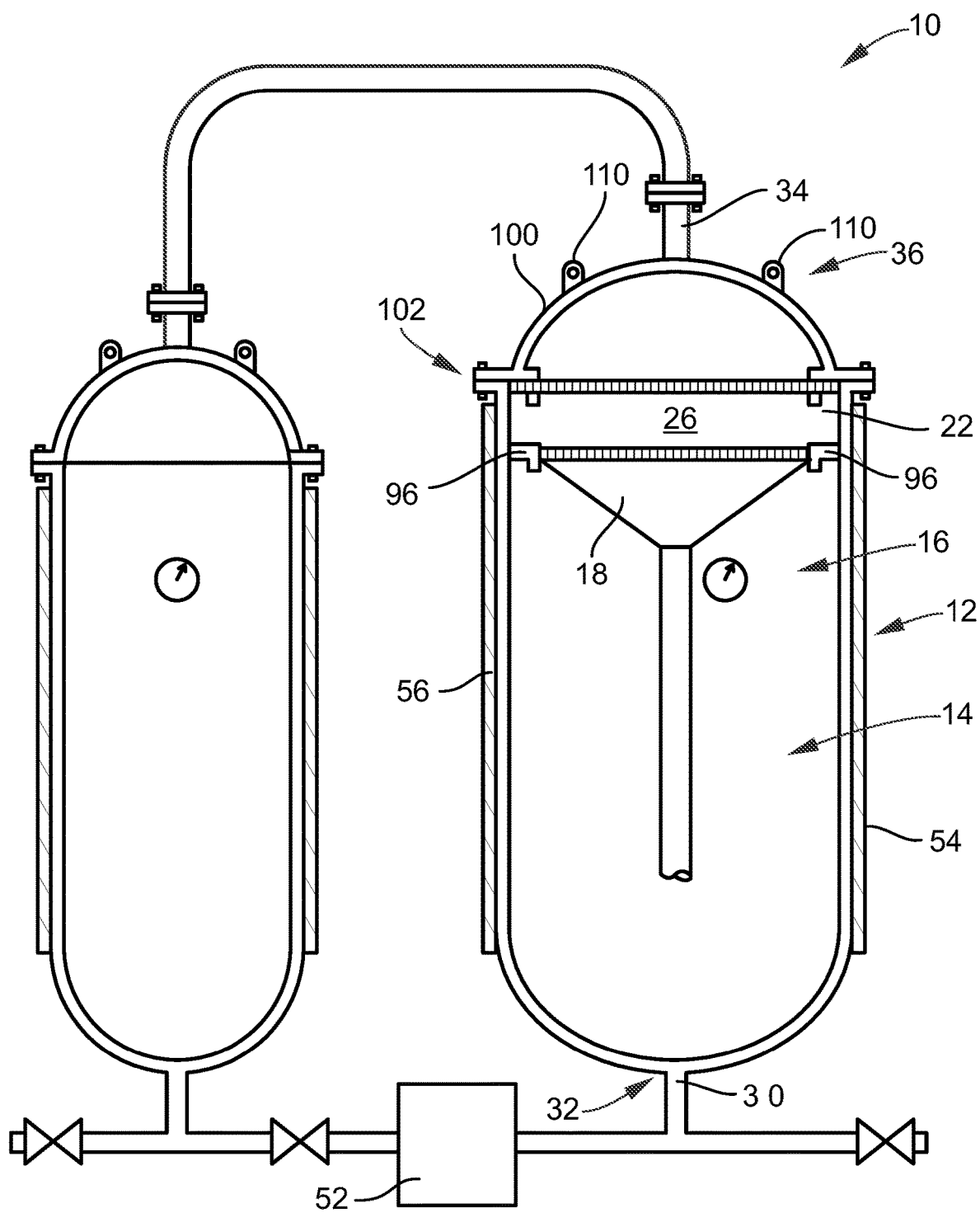
FIG. 6 is a schematic representation of another embodiment of the high pressure lipid extractor, infuser and/or bonder according to select embodiments of the instant disclosure.
Figure 7:
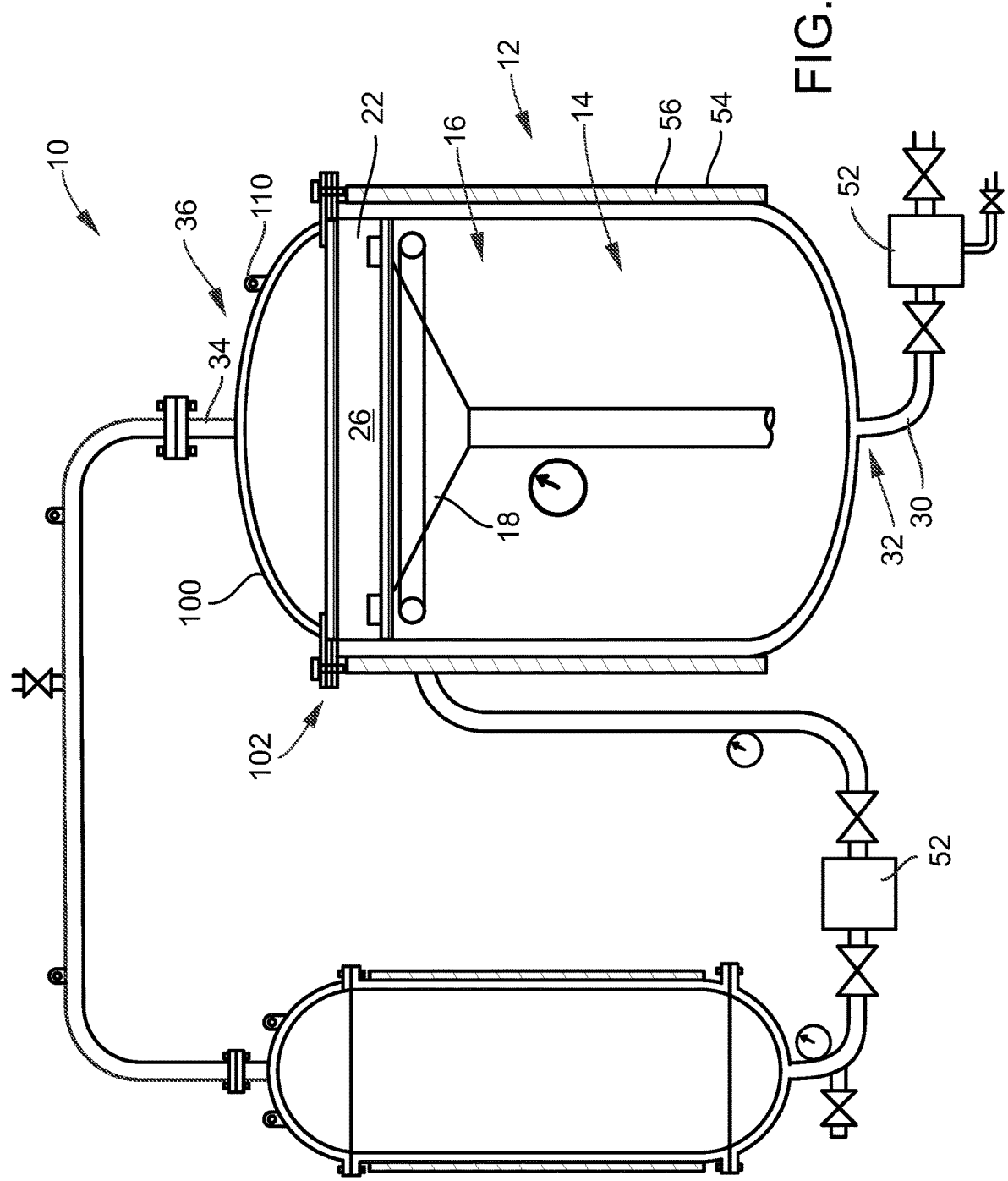
FIG. 7 is a schematic representation of another embodiment of the high pressure lipid extractor, infuser and/or bonder according to select embodiments of the instant disclosure.
Figure 8:
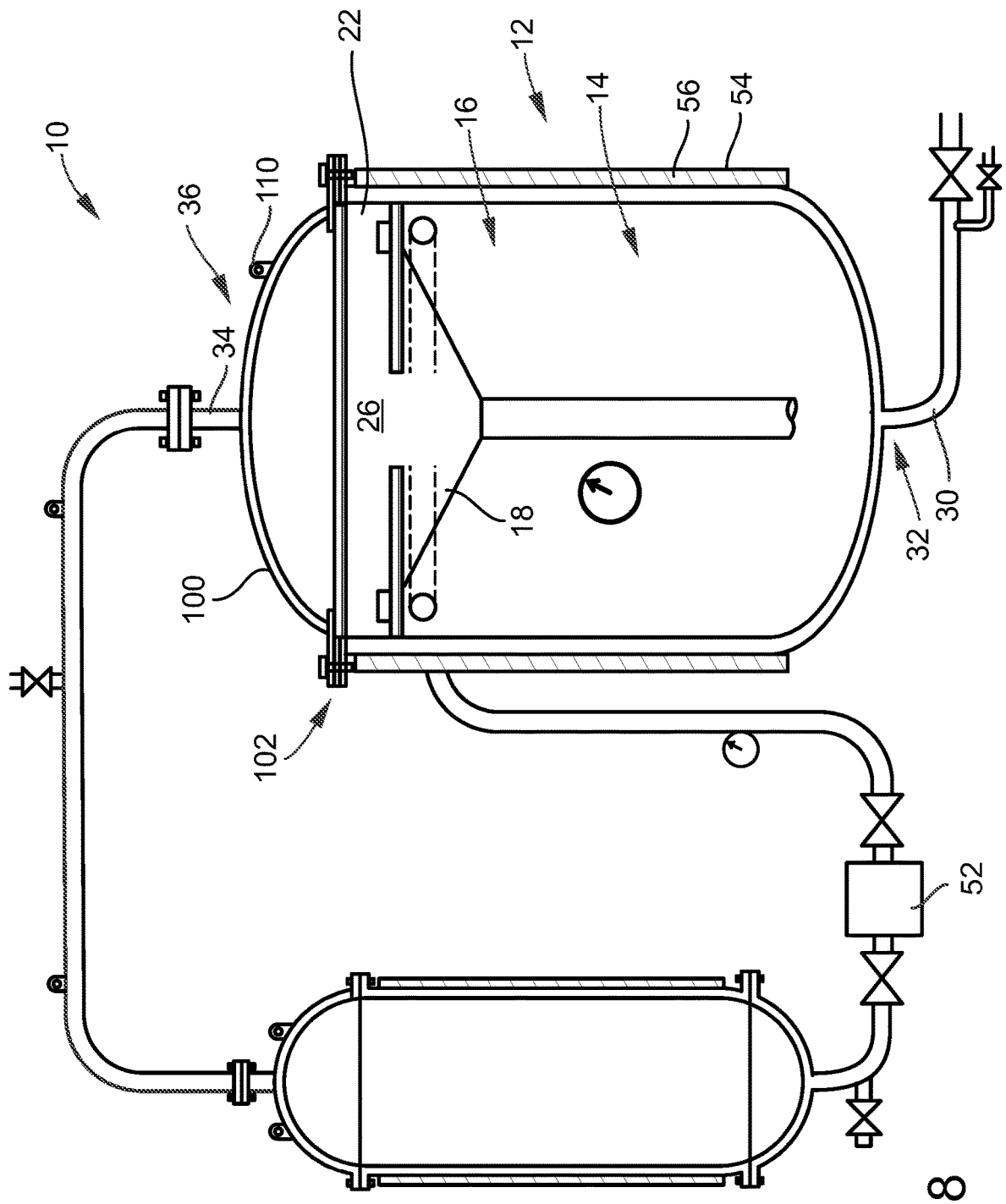
FIG. 8 is a schematic representation of another embodiment of the high pressure lipid extractor, infuser and/or bonder according to select embodiments of the instant disclosure.

Referring now to FIGS. 6-8, preliminary drawings are shown of previous versions of select embodiments of the disclosed recirculating HPL extractor 10 and the progress and changes made in development. Applicant notes that FIGS. 1-4 are version 3 of the disclosed recirculating HPL extractor 10 and are possibly preferred embodiments of the disclosed recirculating HPL extractor 10.

Referring now specifically to FIG. 5, in another aspect, the instant disclosure embraces system 200 for lipid extraction, infusion and/or bonding. The disclosed system 200 generally includes utilizing recirculating HPL extractor 10, or multiple recirculating HPL extractors 10 in any of the various embodiments or combinations of embodiments shown and/or described herein. As such, system 200 for lipid extraction, infusion and/or bonding may generally include recirculating HPL extractor 10, or multiple recirculating HPL extractors 10, configured for extracting, infusing and/or bonding lipids from material 26 with no solvents or chemicals via a pressurized and heated fluid mixture 16, recirculation pump 52, heater 202, holding tank 204, cooler 206, and control panel 208. Recirculating pump 52 may be configured for recirculating the pressurized and heated fluid mixture 16 through recirculating HPL extractor 10. Heater 202 may be configured for heating recirculating HPL extractor 10. Holding tank 204 may be configured to hold and chill the fluid mixture with extracted, infused and bonded lipids. As examples, and clearly not limited thereto, holding tanks 204 may be made from 304 stainless steel, be pressure rated to 15 psi, be glycol jacketed, include shadowless side manway, have a 100 gallon capacity, have a clean in place arm and spray ball, and/or combinations thereof. The cooler may be configured to chill fluid mixture 16 with extracted, infused and bonded lipids in holding tanks 204. Control panel 208 may be configured to provide control for proper operation, temperature, pressure ranges, process timing and/or material flow of system 200. Control panel 208 may include control for all pumps, valves, and steam zones. Control panel 208 may be, but is not limited to, a 12.1 inch touch screen with a color graphic interface. Kettle 12 may be controlled by a motorized variable position steam valve. Glycol zone controls the plate heat exchanger. In addition, all temperature probes or sensors and valve position signals may be wired to control panel 208.

As shown in FIG. 5, in select embodiments of the system for lipid extraction, infusion and bonding disclosed herein, three recirculating HPL extractors 10 may be included along with three recirculation pumps 52, one recirculation pump 52 for each of the three recirculating HPL extractors 10. As such, system 200 for lipid extraction, infusion and/or bonding disclosed herein may include providing 3 recirculating HPL extractor 10 in any of the various embodiments or combination of embodiments shown and/or described herein. In addition, three holding tanks 204 may be included to handle the processed fluid mixture 16 from each of the recirculating HPL extractors 10. In select embodiments of system 200 for lipid extraction, infusion and/or bonding disclosed herein, heater 202 may be steam boiler 203 configured to provide steam to steam jacket 56 of each of the three recirculating HPL extractors 10 for heating each of the three recirculating HPL extractors 10. As an example, and clearly not limited thereto, the boiler 203 may be a 10 HP pressure steam boiler provided by the Columbia Boiler Company of Pottstown, Pa. and have MPH-10 steam gas fired with CRT-7 feed system, and a BS-2 blowdown separator. In select embodiments of the system 200 for lipid extraction, infusion and/or bonding disclosed herein, cooler 206 may be chiller and screw press 207 configured to circulate ethanol and chill it to −40° C. in 45 minutes, where the circulation will continue for 15 extra minutes to drop the fats and lipids out of suspension prior to pumping through filters. As an example, and clearly not limited thereto, screw press 207 may be a CP-6 vincent type screw press with a 5 HP motor, VFD, 250+ pounds per hour, a 152 micron screen minimum, a stand, and/or combinations thereof. A feeder screw conveyor and hopper may be included, and may have, but is not limited to, a 3 HP motor, VFD, be mounted to the screw press, and/or the hopper may hold 120 pounds of biomass. In addition a grant buffer tank may be included to collect and transfer liquids from the press to the process. The gran buffer tank may have a 16 G capacity, and may have sensor ports and legs. In other select embodiments, glycol chiller 210 may be installed outdoors configured to aid in chilling the holding tanks 204. As an example, and clearly not limited thereto, glycol chiller 210 may be a 9 HP chiller with 71968 BTU capacity.

Figure 9:
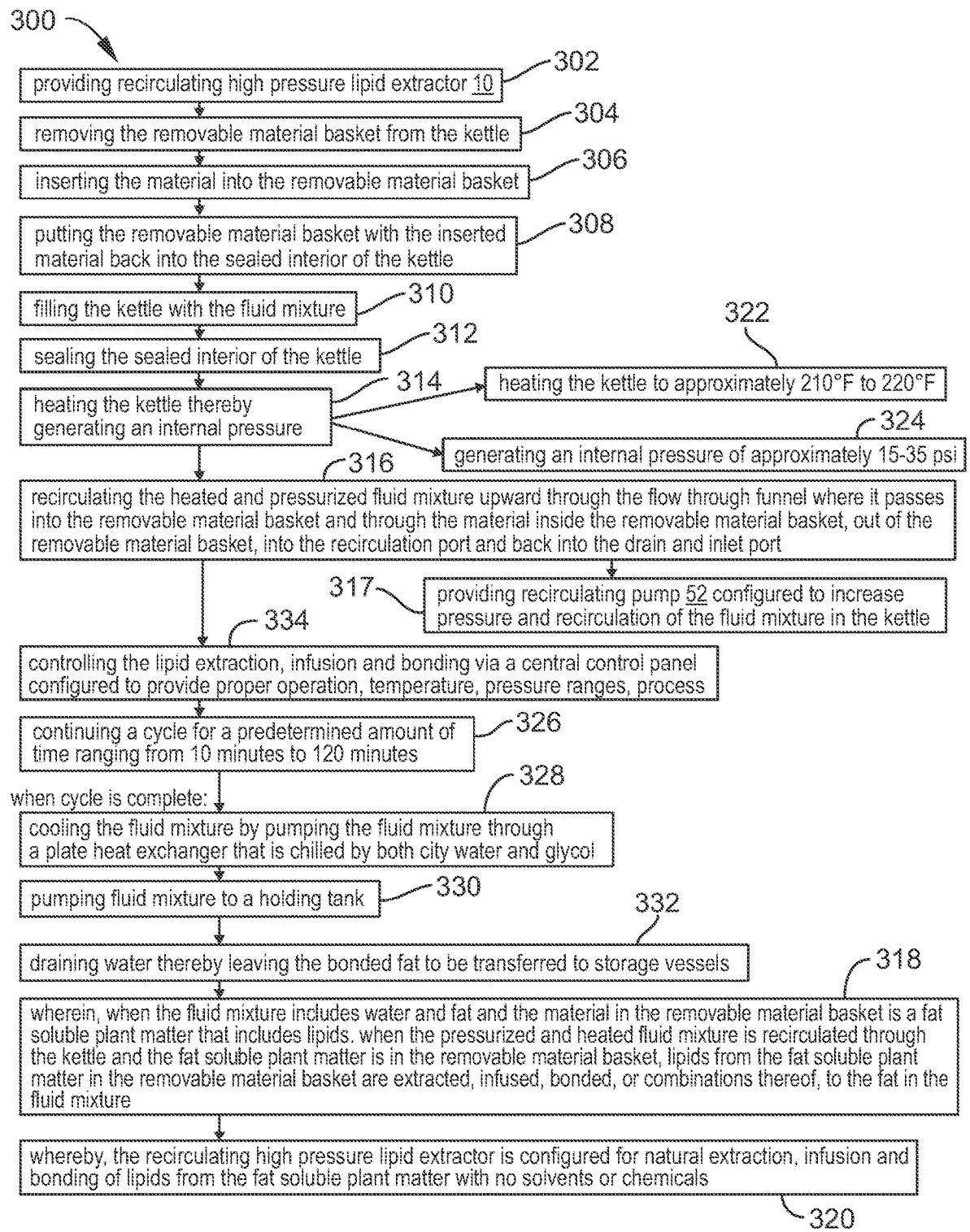
FIG. 9 is a flow chart of a method for lipid extraction, infusion and bonding according to select embodiments of the instant disclosure.

Referring now to FIG. 9, in another aspect, the instant disclosure embraces method 300 for lipid extraction, infusion and/or bonding. In general, method 300 for lipid extraction, infusion and/or bonding may include utilizing recirculating HPL extractor 10 or multiple recirculating HPL extractors 10, in any of the various embodiments or combination of embodiments shown and/or described herein. As such, method 300 for lipid extraction, infusion and/or bonding disclosed herein may include step 302 of providing recirculating HPL extractor 10, or multiple recirculating HPL extractors 10, in any of the various embodiments or combination of embodiments shown and/or described herein. The provided recirculating HPL extractor 10 may be configured for extracting, infusing and/or bonding lipids from material 26 with no solvents or chemicals via a pressurized and heated fluid mixture 16. With the provided HPL extractor(s) 10, the method may further include the steps of: step 304 of removing removable material basket 22 from kettle 12; step 306 of inserting material 26 into removable material basket 22; step 308 of putting the removable material basket 22 with the inserted material 26 back into sealed interior 14 of kettle 12; step 310 of filling sealed interior 14 of kettle 12 with fluid mixture 16; step 312 of sealing sealed interior 14 of kettle 12; step 314 of heating kettle 12 thereby generating an internal pressure; and step 316 of recirculating the heated and pressurized fluid mixture 16 upward through flow funnel 18 where it passes into removable material basket 22 and through material 26 inside removable material basket 22, out of removable material basket 22, into recirculation port 34 and back into drain and inlet port 30 via recirculation pump 52. Wherein, when fluid mixture 16 includes water and fat and material 26 in removable material basket 22 is a fat soluble plant matter that includes lipids, when pressurized and heated fluid mixture 16 is recirculated through kettle 12 and the fat soluble plant matter is in removable material basket 22, lipids from the fat soluble plant matter in removable material basket 22 are extracted, infused, bonded, or combinations thereof in step 318 to the fat in fluid mixture 16. Whereby, recirculating HPL extractor 10 is configured for natural extraction, infusion and bonding in step 320 of lipids from the fat soluble plant matter with no solvents or chemicals. In select embodiments of method 300 for lipid extraction, infusion and/or bonding, step 314 of heating kettle 12 thereby generating an internal pressure may include the steps of: step 322 of heating the kettle to approximately 210° F. to 220° F., and step 324 of thereby generating an internal pressure of approximately 15-35 psi or between 40-45 psi. In select embodiments of method 300 for lipid extraction, infusion and/or bonding, step 316 of recirculating the heated and pressurized fluid mixture 16 may include step 317 of utilizing recirculating pump 52 configured to increase pressure and recirculation of fluid mixture 16 in kettle 12. In select embodiments of method 300 for lipid extraction, infusion and/or bonding, method 300 may further include step 326 of continuing the cycle for a predetermined amount of time, including, but not limited to, ranging from 10 minutes to 120 minutes. When the cycle is complete: method 300 may further include the step 328 of cooling fluid mixture 16 through a plate heat exchanger that is chilled by both city water and glycol; step 330 of pumping fluid mixture 16 to separation tank 204; and step 332 of draining the water from fluid mixture 16, thereby leaving the bonded fat to be transferred to storage vessels; and step 334 of controlling the lipid extraction, infusion and/or bonding via central control panel 208 configured to provide proper operation, temperature, pressure ranges, process, etc.

EXAMPLES

Referring to the embodiments of recirculating HPL extractor 10 in FIGS. 1-4, system 200 of FIG. 5 and method 300 of FIG. 9 for lipid extraction, infusion and/or bonding, an example process could process three 125 pound batches of hemp. Each batch could be blended with 100 gallons of fluid mixture 16 with a carrier oil and water.

A system 200 has been designed based on the setup shown in FIG. 5. Kettle 12 will be filled with fluid mixture 16 with a blend of water and the desired fat, and removable material basket 22 can be filled with material 26 to be processed. With removable material basket 22 returned to kettle 12 and lid 100 securely closed, the steam heated kettle 12 will be heated to approximately 210° F.-220° F. generating an internal pressure of approximately 15-35 psi (not to exceed 50 psi.). The pressure and recirculating pump 52 will move the water/fat mixture upward through flow funnel 18, and as this passes through removable material basket 22, the fats will bond with the fat soluble organic compounds. Recirculating pump 52, along with the rising pressure in lower portion 20 of the tank, moves the water/fat mixture into the upper section 24, through removable return arm 98, and back into kettle 12. This cycle will continue for a predetermined amount of time, ranging from 10 minutes to 120 minutes. When this cycle is complete, the water/fat mixture will be pumped through a plate heat exchanger 207 that is chilled by both city water and glycol via glycol chiller 210. The plate heat exchanger 207 may be designed to circulate the ethanol and chill it to 40° C. in 45 minutes. The circulation could continue for 15 extra minutes to drop the fats and lipids out of suspension prior to pumping through the filters. The plate heat exchanger 207 may be made from 316 stainless steel and/or may include a stainless frame. The water/fat mixture will be pumped to a separation tank 204 where the water will be drained, leaving the bonded fat to be transferred to storage vessels. System 200 will be controlled via central control panel 208 to ensure proper operation, temperature and pressure ranges, process timing, and material flow.

The following is an example steps for operation:
fill kettle 12 with proprietary blend of water and desired fat for fluid mixture 16;
with removable material basket 22 removed, fill with desired amount of material 26;
connect lifting apparatus to removable material basket 22 at the lifting hooks 92 locations;
using lifting apparatus, place removable material basket 22 in kettle 12;
secure hold down rods 108;
replace removable return arm 98;
replace removable lid 100 on kettle 12;
secure removable lid 100 with wing type hold down bolts 106;
turn unit on using the control panel 208;
run cycle;
after cycle ends, unit must cool for specified amount of time;
release removable lid 100 by removing wing type hold down bolts 106;
remove removable return arm 98 and place in cleaning area;
remove hold down rods 108 and place in cleaning area;
connect lifting apparatus to removable material basket 22 at lifting hooks 92 locations;
using lifting apparatus, place removable material basket 22 in designated press area;
empty contents in drain bins;
utilize lifting apparatus move removable material basket 22 to cleaning area; and
pressure wash internal components of kettle 12 to insure cleanliness.

In operation, after the recirculating HPL extractor 10 has been loaded with material 26 to be processed and fluid mixture 16 with fat and water and has been turned on, the process begins. The recirculating HPL extractor 10 can be used for any fat soluble organic compound deriving from organic matter. Kettle 12 may operate at 210° F. to 220° F. and at normal operation will create between 15 psi and 35 psi, or between 40 psi to 45 psi of pressure internally. Heating may be achieved using a heat element and/or steam jacket 56 around kettle 12. To assist in the movement of fluid mixture 16 (fat/water mixture) through removable material basket 22 and to allow for the recirculation of kettle 12, recirculating pump 52 may be placed in line between recirculation port 34 and drain and inlet port 30.

Whereby, fluid mixture 16 (water/fat) may be heated to 210° F. to 220° F. As the water of fluid mixture 16 reaches its boiling point, pressure builds in kettle 12. The pressurized kettle 12 then pushes fluid mixture 16 through flow funnel 18. As the fluid mixture 16 passes through removable material basket 22, the fats from fluid mixture 16 may bond directly to the fat soluble organic compounds of material 26. The pressure in kettle 12 then moves the now bonded fluid mixture 16 through removable return arm 98 and out of recirculation port 34 through recirculating pump 52, then back into kettle 12 via drain and inlet port 30. This cycle may continue for a predetermined amount of time that can range from 10 minutes to 120 minutes depending on the organic material being used as material 26. After the cycle finishes, the bonded fluid mixture 16 either remains in kettle 12 to cool or is pumped to holding tanks 204 to cool. The kettle cooling coils 76 will be in operation during this time to cool the bonded fluid mixture 16. After cooled, the bonded fluid mixture 16 will have separated prior to draining. Water will be drained from the mixture through drain and inlet port 30 leaving the bonded fat to be placed in vessels.

The fluid mixture 16 used in recirculating HPL extractor 10, system 200 and/or method 300 may be any desired fluid mixture for lipid extraction and/or natural lipid extraction with no solvents or chemicals. In addition, material 26 to be processed in recirculating HPL extractor 10, system 200 and/or method 300 may be any desired material or the like. In select embodiments, fluid mixture 16 can include water and fat, and material 26 in removable material basket 22 may be a fat soluble plant matter that includes lipids. Wherein, when the pressurized and heated fluid mixture 16 is recirculated through kettle 12 and the fat soluble plant matter is in removable material basket 22, lipids from the fat soluble plant matter in the removable material basket 22 can be extracted, infused, bonded, or combinations thereof, to the fat in the fluid mixture.

One feature of the disclosed recirculating HPL extractor 10, system 200 and/or method 300 disclosed herein may be that they can be configured for natural extraction, infusion and bonding of lipids from the fat soluble plant matter with no solvents or chemicals. In select example embodiments of recirculating HPL extractor 10, and clearly not limited thereto, the fat of the fluid mixture 16 may include medium-chain triglycerides oils, hemp oil, butter, butter fat, all seed oils, olive oil, or combinations thereof, and the fat soluble plant matter can include *Cannabis* or other botanical extracts including lavender extracts, rosemary extracts, citrus extracts, or mint extracts, or combinations thereof. Wherein, the natural extraction, infusion and bonding with no solvents or chemicals is configured for natural extraction, infusion and bonding of the *Cannabis*, the other botanical extracts, or combinations thereof.

Another feature of the disclosed recirculating HPL extractor 10, system 200 and/or method 300 disclosed herein may be that recirculating HPL extractor 10, system 200 and/or method 300 can be configured to heat and cool the fat in fluid mixture 16 as it recirculates reducing degradation of terpenes, flavonoids, and other cannabinoids.

Another feature of the disclosed recirculating HPL extractor 10, system 200 and/or method 300 disclosed herein may be that recirculating HPL extractor 10, system 200 and/or method 300 can be configured to decarboxylate the *Cannabis*, *Cannabis* extracts, *Cannabis* extract bonded fats, or combinations thereof.

In sum, the purpose of the disclosed recirculating HPL extractor 10, system 200 and method 300 may be to: extract, infuse, and bond *Cannabis* and other botanical (i.e. Lavender, rosemary, citrus, mint, etc.) extracts to Fat (i.e. MCT oils, hemp oil, butter, butter fat, all seed oils, olive oil, etc.); to decarboxylate raw *Cannabis*, *Cannabis* extracts, *Cannabis* extract bonded fats; to create and manufacture pharmaceutical grade tinctures utilizing fat as a carrier, from any and all fat-soluble plant matter (*Cannabis* and other botanicals) for use in the medical field; to create and manufacture pharmaceutical grade tinctures utilizing fat as a carrier, from any and all fat-soluble plant matter (*Cannabis* and other botanicals) for use as a dietary supplement; to create and manufacture pharmaceutical grade tinctures utilizing fat as a carrier, from any and all fat-soluble plant matter (*Cannabis* and other botanicals) for use in the food service industry; and/or combinations thereof

*Cannabis*, as used herein, my refer to *Cannabis*, *Cannabis sativa*, *Cannabis indica*, *Cannabis ruderalis*, hemp, industrial hemp and all cannabinoids (ex. CBD, THC delta9, CBN, CBG, CBDA, THCA, and all others), terpenes, flavonoids, and additional bio-compounds contained within *Cannabis*.

Fat, as used herein, may refer to any fat capable of carrying and or bonding to a fat-soluble carrier.

Decarboxylate, as used herein may refer to a chemical reaction that removes a carboxyl group and releases carbon dioxide. Usually decarboxylation refers to a reaction of carboxylic acids, removing a carbon atom from a carbon chain.

Tincture, as used herein may refer to a solution made by extracting, infusing, fusing, and/or bonding *Cannabis* and other botanical (i.e. lavender, rosemary, citrus, mint, etc.) extracts to fat (i.e. MCT oils, hemp oil, butter, butter fat, all seed oils, olive oil, etc.).

A feature of the present disclosure is that it may allows for all natural extraction and bonding of *Cannabis* and other botanical extracts with no solvents or chemicals.

Another feature of the present disclosure may be its ability to heat and cool the fat as it recirculates reducing degradation of terpenes, flavonoids, and other cannabinoids.

Another feature of the present disclosure may be its ability to recirculate liquid during the brewing process.

Another feature of the present disclosure may be the quantity by which fat bonding and production is achieved.

Another feature of the present disclosure may be the pressure at which it operates.

Another feature of the present disclosure may be that it can utilize recirculation pump 52 to increase pressure and recirculation capabilities.

Another feature of the present disclosure may be that it can be made mobile.

Another feature of the present disclosure may be that it can be scaled from 1 gallon to 5000 gallons.

In the specification and/or figures, typical embodiments of the disclosure have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein but is limited only by the following claims.

The invention claimed is:

1. A recirculating high pressure lipid extractor comprising:
   a kettle with a sealed interior, the sealed interior of the kettle is configured for pressurizing and heating a fluid mixture in the sealed interior;
   a flow funnel positioned in a lower portion of the sealed interior of the kettle;
   a removable material basket positioned on top of the flow funnel in the sealed interior of the kettle in an upper section, the removable material basket being configured to hold a material to be processed inside a flow-through interior of the removable material basket in the upper section of the sealed interior of the kettle, the removable material basket includes:
      a plurality of holes around a bottom portion of the removable material basket;
      a removable lid with micron sized holes on a top of the removable material basket including lifting hooks configured for lifting the removable material basket out of the sealed interior of the kettle;
      a trap door bottom configured to open for removing the material from the removable material basket;
   a drain and inlet port at a bottom of the kettle in communication with the sealed interior of the kettle; and
   a recirculation port approximate a top of the kettle in communication with the sealed interior of the kettle;
   wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material to be processed positioned therein, and back out of the recirculation port.

2. The recirculating high pressure lipid extractor of claim 1 where:
   the fluid mixture includes water and fat; and
   the material in the removable material basket is a fat soluble plant matter that includes lipids;
   wherein, when the pressurized and heated fluid mixture is recirculated through the kettle and the fat soluble plant matter is in the removable material basket, the lipids from the fat soluble plant matter in the removable material basket are extracted, infused, bonded, or combinations thereof, to the fat in the fluid mixture; and
   wherein, the recirculating high pressure lipid extractor is configured for a natural extraction, infusion and bonding of lipids from the fat soluble plant matter with no organic solvents or chemicals.

3. The recirculating high pressure lipid extractor, infuser, and bonder of claim 2, wherein:
   the fat of the fluid mixture includes medium-chain triglycerides oil, hemp oil, butter, butter fat, all seed oils, olive oil, or combinations thereof;
   the fat soluble plant matter includes *Cannabis*, other botanical extracts, or combinations thereof, the other botanical extracts being selected from a group consisting of: lavender extracts, rosemary extracts, citrus extracts, and mint extracts;
   wherein the natural extraction, infusion and bonding with no organic solvents or chemicals is configured for natural extraction, infusion and bonding of the *Cannabis*, the other botanical extracts, or the combinations thereof; and
   wherein, the recirculating high pressure lipid extractor is configured to heat and cool the fat of the fluid mixture as it recirculates reducing degradation of terpenes, flavonoids, and other cannabinoids, whereby the recirculating high pressure lipid extractor is configured to decarboxylate the *Cannabis, Cannabis* extracts, *Cannabis* extract bonded fats, or combinations thereof.

4. The recirculating high pressure lipid extractor of claim 2 further including:
   a removable stainless steel lid configured to seal the sealed interior of the kettle, the removable stainless steel lid is configured to seal the sealed interior of the kettle with a sealing flange, a double O-ring seal and wing type hold down bolts with hold down rods;
   lifting points on the removable stainless steel lid configured for lifting the kettle thereby making the recirculating high pressure lipid extractor mobile;
   a pressure release valve in the removable stainless steel lid configured for releasing pressure over a certain maximum pressure threshold of the sealed interior of the kettle;
   a vent valve in the removable stainless steel lid configured for venting the sealed interior of the kettle;
   a clean-in-place port in the removable stainless steel lid configured for cleaning the sealed interior of the kettle;
   a liquid input port in the removable stainless steel lid configured for inserting the fluid mixture into the sealed interior of the kettle;
   a pressure sensor port in the removable stainless steel lid configured for sensing the pressure in the sealed interior of the kettle; and
   a sample finished product port in the removable stainless steel lid configured for sampling the lipids extracted, infused, bonded, or combinations thereof, to the fat in the fluid mixture.

5. The recirculating high pressure lipid extractor of claim 1, wherein the sealed interior of the kettle is configured to operate at a temperature and at a pressure, the temperature being 210° F. to 220° F., or the pressure being of 15 psi to 50 psi.

6. The recirculating high pressure lipid extractor of claim 5, wherein the sealed interior of the kettle is configured to operate at the temperature being 210° F. to 220° F. and at the pressure being 15 psi to 35 psi or at the pressure being 40 psi to 45 psi.

7. The recirculating high pressure lipid extractor of claim 1 further including a recirculation pump connected between the recirculation port approximate the top of the kettle and the drain and inlet port at the bottom of the kettle, wherein the recirculation pump is configured to increase pressure and recirculation of the fluid mixture in the kettle.

8. The recirculating high pressure lipid extractor of claim 7, wherein the recirculation pump includes a case rating of 50 psi.

9. The recirculating high pressure lipid extractor of claim 1, wherein the kettle is:
   configured to be mobile;
   made from a stainless steel material;
   the kettle interior is sized to contain from 1 gallon to 5000 gallons of the fluid mixture; or combinations thereof.

10. The recirculating high pressure lipid extractor of claim 1, wherein the kettle includes a steam jacket configured for heating the fluid mixture in the sealed interior of the kettle, where the steam jacket of the kettle including:
- at least one feed port configured for feeding steam into the steam jacket of the kettle; and
- at least one return port for returning the steam out of the steam jacket of the kettle.

11. The recirculating high pressure lipid extractor of claim 10, wherein the steam jacket of the kettle includes:
- an upper steam jacket around the removable material basket in the upper section of the sealed interior of the kettle, the upper steam jacket including:
  - at least one upper feed port configured for feeding the steam into the upper steam jacket of the kettle; and
  - at least one upper return port for returning the steam out of the upper steam jacket of the kettle;
- a lower steam jacket around the flow funnel in the lower portion of the sealed interior of the kettle, the lower steam jacket including:
  - at least one lower feed port configured for feeding the steam into the lower steam jacket of the kettle; and
  - at least one lower return port for returning the steam out of the lower steam jacket of the kettle; and
- a temperature sensor port configured for sensing a temperature inside the kettle in the upper section and the lower portion of the sealed interior, whereby the temperature sensor port is configured to communicate with the steam jackets of the kettle for regulating the temperature of the fluid mixture inside the kettle.

12. The recirculating high pressure lipid extractor of claim 1, wherein the sealed interior of the kettle includes a shelf configured for holding the removable material basket on top of the flow funnel.

13. The recirculating high pressure lipid extractor of claim 1, wherein the recirculation port includes a removable return arm configured to be removed for inserting and removing the removable material basket.

14. A system for lipid extraction, infusion and bonding comprising:
- at least one recirculating high pressure lipid extractor, wherein each of the at least one recirculating high pressure lipid extractors is configured for extracting, infusing and bonding lipids from a material with no organic solvents or chemicals via a pressurized and heated fluid mixture, each of the at least one recirculating high pressure lip extractors are configured to operate with:
  - a recirculation pump configured for recirculating the pressurized and heated fluid mixture through each of the at least one recirculating high pressure lipid extractors;
  - a heater configured for heating each of the at least one recirculating high pressure lipid extractors;
  - a holding tank configured to hold the fluid mixture with extracted, infused and bonded lipids;
  - a cooler configured to chill the fluid mixture with extracted, infused and bonded lipids in the holding tank, the cooler comprising a chiller and screw press configured to circulate ethanol to chill the fluid mixture; and
- a control panel configured to provide control for operating the system.

15. The system for lipid extraction, infusion and bonding of claim 14, wherein each of the at least one recirculating high pressure lipid extractors comprises:
- a kettle with a sealed interior configured for pressurizing and heating a fluid mixture in the sealed interior, the sealed interior of the kettle being configured to operate at temperatures of 210° F. to 220° F. or at pressures of 15 psi to 50 psi, wherein the kettle includes a steam jacket configured for heating the fluid mixture in the sealed interior of the kettle, where the steam jacket of the kettle including:
  - at least one feed port configured for feeding the steam into the steam jacket of the kettle; and
  - at least one return port for returning the steam out of the steam jacket of the kettle;
- a flow funnel positioned in a lower portion of the sealed interior of the kettle;
- a removable material basket positioned on top of the flow funnel in the sealed interior of the kettle in an upper section, the removable material basket being configured to hold a material inside a flow-through interior of the removable material basket in the upper section of the sealed interior of the kettle, the removable material basket including:
  - a plurality of holes around a bottom portion of the removable material basket;
  - a removable lid with micron sized holes on a top of the removable material basket including lifting hooks configured for lifting the removable material basket out of the sealed interior of the kettle; and
  - a trap door bottom configured to open for removing material from the removable material basket;
- the sealed interior of the kettle including a shelf configured for holding the removable material basket on top of the flow funnel;
- a drain and inlet port at a bottom of the kettle in communication with the sealed interior of the kettle;
- a recirculation port approximate a top of the kettle in communication with the sealed interior of the kettle, the recirculation port including a removable return arm configured to be removed for inserting and removing the removable material basket;
- a recirculation pump connected between the recirculation port approximate the top of the kettle and the drain and inlet port at the bottom of the kettle, wherein the recirculation pump is configured to increase pressure and recirculation of the fluid mixture in the kettle;
- a removable stainless steel lid configured to seal the sealed interior of the kettle with a sealing flange including a double O-ring seal and wing type hold down bolts with hold down rods configured to seal the lid to the sealed interior of the kettle;
- lifting points on the removable stainless steel lid configured for lifting the kettle thereby making the recirculating high pressure lipid extractor mobile;
- a pressure release valve in the removable stainless steel lid configured for releasing pressure over a certain threshold of the sealed interior of the kettle;
- a vent valve in the removable stainless steel lid configured for venting the sealed interior of the kettle;
- a clean-in-place port in the removable stainless steel lid configured for cleaning the sealed interior of the kettle;
- a liquid input port in the removable stainless steel lid configured for inserting the fluid mixture into the sealed interior of the kettle;
- a pressure sensor port in the removable stainless steel lid configured for sensing the pressure in the sealed interior of the kettle; and a sample finished product port in the removable stainless steel lid configured for sampling the lipids extracted, infused, and bonded, to a fat in the fluid mixture;

wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material positioned therein, and back out of the recirculation port;

wherein:

the fluid mixture includes water and the fat; and the material in the removable material basket is a fat soluble plant matter that includes lipids;

wherein, when the pressurized and heated fluid mixture is recirculated through the kettle and the fat soluble plant matter is in the removable material basket, lipids from the fat soluble plant matter in the removable material basket are extracted, infused, and bonded, to the fat in the fluid mixture;

wherein, the recirculating high pressure lipid extractor is configured for natural extraction, infusion and bonding of lipids from the fat soluble plant matter with no solvents or chemicals;

wherein:

the fat of the fluid mixture includes medium-chain triglycerides oils, hemp oil, butter, butter fat, all seed oils, olive oil, or combinations thereof;

the fat soluble plant matter includes *Cannabis*, other botanical extracts, or combinations thereof, the other botanical extracts being selected from a group consisting of lavender extracts, rosemary extracts, citrus extracts, and mint extracts;

wherein the natural extraction, infusion and bonding with no organic solvents or chemicals is configured for natural extraction, infusion and bonding of the *Cannabis*, the other botanical extracts, or the combinations thereof; and wherein, the recirculating high pressure lipid extractor is configured to heat and cool the fat in the fluid mixture as it recirculates reducing degradation of terpenes, flavonoids, and other cannabinoids, whereby the recirculating high pressure lipid extractor is configured to decarboxylate the *Cannabis, Cannabis* extracts, *Cannabis* extract bonded fats, or combinations thereof.

16. The system for lipid extraction, infusion and bonding of claim 14 comprising:

three of the recirculating high pressure lipid extractors;

three recirculation pumps, one recirculation pump for each of the three recirculating high pressure lipid extractors; and three holding tanks;

the heater comprising a steam boiler configured to provide steam in a steam jacket of each of the three recirculating high pressure lipid extractors for heating each of the three recirculating high pressure lipid extractors;

the chiller and screw press is configured to circulate the ethanol to chill the the fluid mixture to −40° C. in 45 minutes, where the circulation will continue until the fats and lipids drop out of suspension prior to pumping through filters; and a glycol chiller configured to chill the holding tanks.

17. A recirculating high pressure lipid extractor comprising:

a kettle with a sealed interior configured for pressurizing and heating a fluid mixture in the sealed interior, the kettle includes a steam jacket configured for heating the fluid mixture in the sealed interior of the kettle, where the steam jacket of the kettle including:

at least one feed port configured for feeding steam into the steam jacket of the kettle; and at least one return port for returning the steam out of the steam jacket of the kettle;

wherein the steam jacket of the kettle includes:

an upper steam jacket around the removable material basket in the upper section of the sealed interior of the kettle, the upper steam jacket including:

at least one upper feed port configured for feeding the steam into the upper steam jacket of the kettle; and at least one upper return port for returning the steam out of the upper steam jacket of the kettle;

a lower steam jacket around the flow funnel in the lower portion of the sealed interior of the kettle, the lower steam jacket including:

at least one lower feed port configured for feeding the steam into the lower steam jacket of the kettle; and at least one lower return port for returning the steam out of the lower steam jacket of the kettle; and a temperature sensor port configured for sensing a temperature inside the kettle in the upper section and the lower portion of the sealed interior, whereby the temperature sensor port is configured to communicate with the steam jacket of the kettle for regulating the temperature of the fluid mixture inside the kettle;

a flow funnel positioned in a lower portion of the sealed interior of the kettle;

a removable material basket positioned on top of the flow funnel in the sealed interior of the kettle in an upper section, the removable material basket being configured to hold a material to be processed inside a flow-through interior of the removable material basket in the upper section of the sealed interior of the kettle;

a drain and inlet port at a bottom of the kettle in communication with the sealed interior of the kettle; and a recirculation port approximate a top of the kettle in communication with the sealed interior of the kettle;

wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material to be processed positioned therein, and back out of the recirculation port.

18. A recirculating high pressure lipid extractor comprising:

a kettle with a sealed interior configured for pressurizing and heating a fluid mixture in the sealed interior;

a flow funnel positioned in a lower portion of the sealed interior of the kettle;

a removable material basket positioned on top of the flow funnel in the sealed interior of the kettle in an upper section, the removable material basket being configured to hold a material to be processed inside a flow-through interior of the removable material basket in the upper section of the sealed interior of the kettle;

a drain and inlet port at a bottom of the kettle in communication with the sealed interior of the kettle;

a recirculation port approximate a top of the kettle in communication with the sealed interior of the kettle; and cooling coils configured for cooling the fluid mixture after it is pressurized, heated and recirculated through the sealed interior of the kettle;

wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material to be processed positioned therein, and back out of the recirculation port.

19. A recirculating high pressure lipid extractor comprising:

a kettle with a sealed interior configured for pressurizing and heating a fluid mixture in the sealed interior;

a flow funnel positioned in a lower portion of the sealed interior of the kettle;

a removable material basket positioned on top of the flow funnel in the sealed interior of the kettle in an upper section, the removable material basket being configured to hold a material to be processed inside a flow-through interior of the removable material basket in the upper section of the sealed interior of the kettle;

a drain and inlet port at a bottom of the kettle in communication with the sealed interior of the kettle; and a recirculation port approximate a top of the kettle in communication with the sealed interior of the kettle, the recirculation port includes a removable return arm configured to be removed for inserting and removing the removable material basket;

wherein, when the fluid mixture is inserted into the sealed interior of the kettle, the recirculating high pressure lipid extractor is configured to pressurize and heat the fluid mixture and recirculate the pressurized and heated fluid mixture from the recirculation port approximate the top of the kettle into the drain and inlet port at the bottom of the kettle, where the pressurized and heated fluid mixture flows through the flow funnel, into the removable material basket and through the material to be processed positioned therein, and back out of the recirculation port.

* * * * *